United States Patent
Hashimoto et al.

(10) Patent No.: US 6,270,173 B1
(45) Date of Patent: Aug. 7, 2001

(54) FIXING STRUCTURE OF LINK AND PIN OF TRAVELLING CRAWLER BELT, AND FIXING METHOD THEREOF

(75) Inventors: Akira Hashimoto; Teiji Yamamoto; Hiroyuki Nakaishi; Kenichi Hisamatsu; Seiji Miyaura, all of Osaka-fu (JP)

(73) Assignee: Komatsu Limited, Tokyo (JP)

( * ) Notice: Subject to any disclaimer, the term of this patent is extended or adjusted under 35 U.S.C. 154(b) by 0 days.

(21) Appl. No.: 09/396,339

(22) Filed: Sep. 15, 1999

(30) Foreign Application Priority Data

Sep. 16, 1998 (JP) ................................. 10-261838
Jun. 4, 1999 (JP) ................................. 11-157688

(51) Int. Cl.⁷ ............................. F16G 13/06; B21L 9/06; B62D 55/12
(52) U.S. Cl. ......................... 305/202; 305/220; 305/201; 59/7
(58) Field of Search ................................. 305/185, 202, 305/204, 200, 201, 205, 59; 59/7, 30

(56) References Cited

U.S. PATENT DOCUMENTS

| | | | |
|---|---|---|---|
| 2,983,158 | * 5/1961 | Hodlewsky | 59/7 |
| 3,699,637 | 10/1972 | Roslek . | |
| 4,125,298 | 11/1978 | Heurich et al. . | |
| 4,612,765 | * 9/1986 | Livesay | 59/7 |
| 4,618,190 | * 10/1986 | Garman et al. | 305/204 |
| 4,881,365 | * 11/1989 | Moriki et al. | 59/7 |
| 5,201,171 | * 4/1993 | Anderton et al. | 305/204 |
| 5,257,858 | * 11/1993 | Taft | 305/204 |

FOREIGN PATENT DOCUMENTS

3629613 * 3/1988 (DE) ..................................... 305/200

* cited by examiner

Primary Examiner—S. Joseph Morano
Assistant Examiner—Jason R. Bellinger
(74) Attorney, Agent, or Firm—Bell, Boyd & Lloyd LLC

(57) ABSTRACT

In a travelling crawler belt in which a pair of left and right links are connected by pins respectively press-fitted into the corresponding links, a fixing end surface of the pin or the links is continuously and locally pressed and deformed in an axial direction of the pin from the fixing end surface, along an inner or outer peripheral portion of an opening of a pin-press-fit hole. Then, a part of the opening peripheral portion of the end of the pin or the link is enlarged or reduced in diameter, so that the diametrically increased or reduced portion is retained and fixed to a mating retaining space. With this fixing method, it is possible to easily and strongly couple the links and the pin, and to obtain a fixing structure of the links and the pin for a crawler belt capable of sufficiently securing a holding force of the pin in the axial direction. When the pin is fixed at the time of the assembling of the pin, an existing press can be used without requiring any exclusive machine, and it is possible to easily and reliably assemble the links and the pin for the crawler belt.

10 Claims, 15 Drawing Sheets

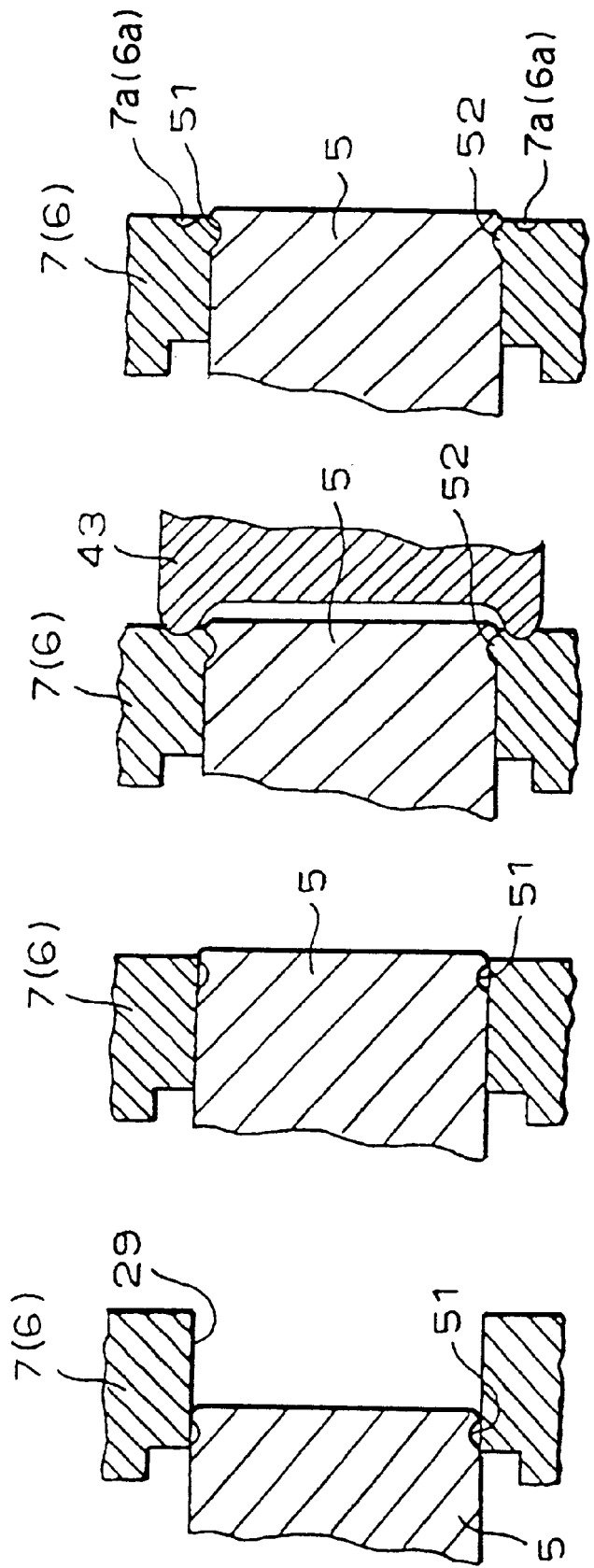

FIXING STRUCTURE OF LINK AND PIN OF TRAVELLING CRAWLER BELT, AND FIXING METHOD THEREOF

BACKGROUND OF THE INVENTION

1. Field of the Invention

The present invention relates to a fixing structure of a link and a pin of a travelling crawler belt used for a crawler vehicle, and a fixing method thereof.

2. Description of the Related Art

As shown in FIG. 14, in a conventional crawler belt 1 used for a crawler vehicle of a construction equipment such as a bulldozer and a tractor, a plurality of crawler plates 2 to contact with the ground are mounted to an endless link chain 3 by bolts. The link chain 3 is assembled by sequentially press-fitting respective ends of left links 6 and right links 7 onto, for example, cylindrical bushes 4 and connecting pins 5 which are inserted into the bushes 4 such that opposite ends of the connecting pins 5 are exposed outside. The respective ends of the links 6 and 7 are connected to each other in a jointed manner by the pins 5 in a state in which the links 6 and 7 are spaced from each other.

At each of the ends of the links 6 and 7, there is disposed a non-illustrated sealing member which seals lubricant for preventing an internal friction between the pin 5 and the bush 4, and a non-illustrated spacer for preventing the sealing member from being crushed. The lubricant stored in the pin 5 is supplied to a space between the pin 5 and the bush 4.

The link chain 3 is generally used for travelling on the ground such as of sand, gravel, crushed stone, or soft ground, and ascent ground. Therefore, the link chain 3 is liable to receive external force applied to the links 6 and 7 in an axial direction thereof by, for example, flange of a lower roller of a non-illustrated vehicle body, or external force applied to an end surface of the pin 5 in an axial direction thereof by a roller guard of the vehicle body, or the likewise external force. For this reason, it is necessary to strongly press-fit the ends of the links 6 and 7 so that the pin 5 does not move in the axial direction by the external force. When a retaining force of the pin 5 is small, the pin 5 would be displaced or pulled out. Thus, the lubricant-sealing member and the crush-preventing spacer disposed at each of the ends of the links 6 and 7 would be deformed, displaced in positions, damaged or so on.

If the sealing member and the crush-preventing spacer for the sealing member are damaged or the like, the lubricant is consumed extremely. As a result, internal friction is generated between the pin 5 and the bush 4 and thus, the pin 5 and the bush 4 are rapidly damaged, so that the link chain 3 looses its original function. In order to prevent the pin 5 from being displaced in position or being pulled out, a large pressing margin Is usually secured to strengthen the fixation by the press-fit. However, since there is a limit to strengthen the fixation by the press-fit, it is necessary to employ a structure for mechanically preventing the pulling out of the pin 5 in addition to the press-fit of the links 6 and 7 with respect to the pin 5.

In order to overcome such problems, there have been developed a ring-type structure for preventing the pin from being pulled out, as shown in FIG. 15 for example, or a structure for preventing the pin from being pulled out as disclosed in Japanese Patent Laid-open No. 5-213237 as shown in FIG. 16. The former prior art employs a structure in which each pin 5 for connecting links has at its one end an annular groove 8, a C-shaped pulling-out-preventing member (not shown) is engaged with the annular groove 8 in a state in which the pin 5 abuts with each end of the links 6 and 7. According to the latter prior art, as shown in FIG. 16, each pin 5 has at its one end an annular groove 8 having an arc cross section. Portions of outer peripheries of bosses of the links 6 and 7 are pressed and deformed by punch devices 9 which are disposed radially around and opposing to the annular groove 8 so that small blocks are allowed to project into and engaged with the annular groove 8. In FIG. 16, a reference number 10 represents a lubricant-sealing member, and a reference number 11 represents a crush-preventing spacer for the sealing member 10.

Meanwhile, in general, the term of "pulling out of pin" means a phenomenon that a link is removed from the pin. When the link moves outside of the pin, a gap is made between the bush and the sealing member interposed between the bush and the link, so that the lubricant leaks out, thus the lubricating function is lost and the vehicle can not run.

A main reason that the "pulling out of pin" phenomenon occurs is a load in the above-mentioned axial direction applied to the link. Especially at the time of steering, movement of the pin is facilitated by external forces, in many directions, applied between the bush and a sprocket.

For this reason, even if the link moves relative to the pin, and a displacement of 1 mm is generated for example, the vehicle can not run as described above. On the other hand, a life span of the crawler belt may be determined by abrasion of the bush. This is caused by engagement between the bush and the sprocket, and only the engaged surfaces between the bush and the sprocket is worn out. Thereupon, in a state in which the bush is rotated with a predetermined angle relative to the link, a position of the bush where the bush is worn out most is displaced from the forward to the rearward in the circumferential direction, and the link is press-fitted and fixed again. At that time, the lubricant-sealing member is replaced with new one if necessary. With this operation, it is possible to substantially extend the life span of the bush.

However, in order to change the press-fit position of the bush and the link in phase in the circumferential direction, it is necessary to take out the link from the pin. Since a large press-fit margin is usually secured as described above so that the pin and the link are strongly press-fitted and fixed by a great press-fit force, a further greater pulling force is necessary for pulling out the link which is press-fitted and fixed to the pin, thus a great number of striped scratches are made on the press-fit surface of the pin and the link. Therefore, if the press-fit position of the pin and the link is to be changed in the circumferential direction, although the fixation strength is not essentially lowered, the striped scratches must be removed in many cases after the link is pulled out from the pin. By this removing operation, the press-fit strength tends to be rather lowered.

Thereupon, in addition to the general press-fit fixation of the pin and the link as described above, the mechanical pulling-out-preventing structure of the pin is further employed. In a case of the mechanical pulling-out-preventing structure shown in FIG. 15, since the C-shaped retaining members are retained to the respective ends of the links 6 and 7, it is necessary to align the ends of the links 6 and 7 with the annular groove 8 in position, so that high precision in size and complicated machining are required for the products. As a result, variation among the products is prone to be generated, so that the number of defective parts generated is not small. As a result, extra time and labor are required for assembling the respective links 6, 7 and the pin 5, so that the operation is prone to be complicated, and a certain skill is required for the assembling operation.

According to the above-described Japanese Patent Application Laid-open No. 5-213237, a thin link boss is pressed from outside to form a plurality of plastically deforming portions in the circumferential direction thereof, and the small blocks are projected in the annular groove 8 formed in the end of the pin 5 for retaining. Since the pressing operation is carried out only by locally punching the outer periphery of the boss in its diametrically-shrinking direction, the number of portions to be engaged with the pin 5 is small, and the projecting length and thickness of the engaged portion are small. Therefore, the force for retaining the pin 5 in the axial direction thereof is so small that the durability can not be expected. Thus, when the respective links 6 and 7 receive external force or the like in a thrust direction applied from a flange of a lower roller or a roller guard of the vehicle body as described above, the lubricant-sealing member 10 and the crush-preventing spacer 11 disposed in a joint portion of the links 6 and 7 tend to be damaged, likewise the conventional fixation merely by press-fit.

Further, since it is impossible to visually check the annular groove 8 of the pin 5 press-fitted to the boss of the links 6 and 7 from outside, there are problems that it is extremely difficult to reliably retain the small blocks projecting from an inner wall of the boss to the annular groove 8, so that it can not determine whether the small blocks are reliably engaged within the annular groove 8 not only during the assembling operation of the links 6, 7 and the pin 5, but also after the assembling operation. Further, since each boss projects from a side surface of the link, the boss is prone to interfere with outside obstructions, rocks and the like, thus rattle is prone to be generated.

Furthermore, it is necessary to dispose exclusive punching devices around the bosses in addition to the link press used for assembling the links 6, 7 and the pins 5. For this reason, the projecting amount of each boss must be set great, so that the cost of material, the cost of equipment and the manufacturing cost are increased. In addition to these, variation among products is prone to be generated and the number of defective parts is not small as compared with the fixing structure disclosed in the above mentioned Japanese Patent Laid-open No. 61-184178, thus the operation is prone to be complicated.

SUMMARY OF THE INVENTION

The present invention has been accomplished to overcome the conventional problems, and its object is to provide a fixing structure of a link and a pin of a crawler belt and a fixing method thereof in which the links and pins can be coupled to each other strongly even if the press-fit force of the pins with respect to pin-press-fit holes of the conventional links is reduced, the retaining force of the links with respect to the axial direction of the pins can sufficiently ensured, and it is possible to easily and reliably process a pin-pulling- out-preventing structure by a pressing-for-fixing jig mounted to an existing press without using an exclusive machine.

In order to achieve the above object, according to a first aspect of the present invention, there is provided a fixing structure of links and pins for a travelling crawler belt in which a plurality of pins and bushes are sequentially press-fitted into corresponding pin-press-fit holes and bush-press-fit holes of the links and connected in an endless manner, wherein at least a part of an outer fixing end surface of each of the pins or each of the links includes a plastically deforming portion by pressing in an axial direction of the pin.

That is, in the present invention, by pressing a part of the outer side fixing end surface of the pin or the link in the axial direction of the pin, the pressed portion is deformed in the pressing direction. If there is a flexibility for the deformation of the outer peripheral surface of an end of the pin or an inner peripheral surface of the press-fit hole, a projection is formed on the surface in the diametrical direction by that deformation. If a part of the outer fixing end surface of the pin or the link is to be pressed to form a projection, a mating link or pin has allowance for receiving said projection, and there is formed a retaining space for preventing the relative movement of the pin and the links in the axial direction, the projection is projected toward the retaining space and retained in the space by pressing of the end surface. The retaining space at that time can be formed arbitrarily as far as it is within a forming region of the projection of the pin or the links, and any special machining precision is not required.

By the retaining of the projection in the retaining space, the relative retaining force of the pin and the links in the axial direction is secured with sufficient strength. Further, since a size of the projection and the retaining space corresponding thereto can be set arbitrarily, the retaining force can be set largest, so that the relative movement of the pin and the links due to impact from outside applied to a normal travelling crawler belt is prevented completely, and rattle is not generated. Therefore, as described above, even if each of the links receives impact or the like in the axial direction applied from a flange of a lower roller, a roller guard of a vehicle body or the like, it is possible to prevent the lubricant-sealing member and the crush preventing spacer from being deformed and damaged, and to sufficiently secure durability as a link chain.

For example, a ring-like retaining groove is formed in a peripheral surface of the press-fit end of the pin, and then a part of the peripheral edge end surface of the pin-press-fit hole of the link is pressed so that a projection is formed by plastic deformation extending from a pressing end to an inner peripheral surface of the pin-press-fit hole of the link. The projection is retained and fixed in the retaining groove. At that time, when the pin is worn and the link is pulled out from the pin to change the press-fit position with respect to the link, if the pulling out force is set greater than the shearing strength of the projection, the projection is cut when the pin is pulled out. The pulling out force at that time is naturally greater than the impact force which is normally applied to the travelling crawler belt.

On the other hand, when a part of the press-fit end surface of the pin for example is pressed in its axial direction and enlarged in diameter along the opening end surface peripheral portion of the pin-press-fit hole of the link, a shape capable of being easily plastically deformed is employed even if the hardness of the end surface of the pin is high. The most typical shape is formed such that the end of the pin which is enlarged in diameter is has a recess opening at its end surface and having a taper surface whose inner peripheral surface is gradually reduced in diameter toward the bottom. With this structure, there is formed a diametrically enlarged portion capable of easily providing a retaining force in the axial direction of the pin by a relatively small pressing force in the axial direction of the pin. The shape of the cross section of the recess may be circular, polygonal or the like.

Further, a configuration of the end surface of the pin which is enlarged in diameter, a plurality of slits may be formed in the opening peripheral edge portion of the recess. When the recess of the pin end surface is pressed by a punch, it is possible to easily deform the peripheral edge portion of the recess in the diametrically enlarging direction by a smaller pressing force, and it is possible to secure a necessary shearing force in the thrust direction by a plurality of deformed flanges formed in the circumferential direction via the slits. Therefore, a desired holding force in the axial direction of the pin is secured.

According to a second aspect of the invention, the plastically deforming portion extends by a necessary length at a peripheral edge portion of the pin-press-fit hole of the link or at the pin in a circumferential direction thereof. The plastically deforming portion may be merely pressed and deformed in a point manner, but in order to secure the shearing strength of the above-mentioned projection, it is preferable to form the pressed surface as an arc surface extending in the circumferential direction.

According to a third aspect of the invention, a plurality of the plastically deforming portions are formed, with a predetermined phase difference, at a peripheral edge portion of the pin-press-fit hole of the link or at an end surface of the pin in a circumferential direction thereof. When the pin-press-fit position with respect to the links is to be changed because of worn-out of the bush, only if the pin is once pulled out from the link and the plastically deformed portion is rotated by the above-described phase, the pin can be reused.

According to a forth aspect of the invention, the plastically deforming portion is formed via a wedge-shaped arc member. That is, a space for fitting the wedge-shaped arc member is formed in the pin-press-fit hole peripheral edge portion or the pin end surface in the circumferential direction, and then the wedge-shaped arc member is fitted into the fitting space. If the wedge-shaped arc member is pressed in the axial direction of the pin, a portion adjacent the fitting space is enlarged or reduced in diameter to form a projection, so that the projection is retained and fixed in the retaining space.

The above-described links and pin, the end of the pin can swiftly, accurately and strongly be fixed to the pin-press-fit hole of the link by a fixing method of the links and pins for a crawler belt according to the present invention. According to a fifth aspect of the present invention, the fixing method comprises the steps of: press-fitting each of the pins into a corresponding one of the pin-press-fit holes of the links; disposing a pressing-for-fixing jig coaxially with an outer fixing end surface of the pin or link; pressing the outer fixing end surface of the pin or link by the pressing-for-fixing jig; and plastically deforming a part of the outer fixing end surface of the pin or link by pressing of the pressing-for-fixing jig.

According to the fifth aspect, since the invention is based on a basic principle that the pin is press-fitted to the pin-press-fit hole and then, the pressing-for-fixing jig is opposed to the outer fixing end surface of the pin or the link, the outer fixing end surface of the pin or the link is pressed in the axial direction by the pressing-for-fixing jig, and a part of the outer fixing end surface of the pin or the link is plastically deformed through inside. Therefore, it is unnecessary to forming the link boss large as in prior art, or to dispose the pressing apparatus around the link boss. Therefore, it is possible to reduce the material cost and space occupied by equipment.

According to a sixth aspect of the invention, the method further comprises the steps of: press-fitting the pin into the pin-press-fit hole of said link by a press; mounting the pressing-for-fixing jig to the press; and operating the press, and pressing the outer fixing end surface of the pin or link by the pressing-for-fixing jig.

Although it is possible to press and deform the outer fixing end surface of the pin or the link using a press exclusively for pressing, since the end surface is deformed by pressing in the press-fit direction of the link, i.e., in the same direction as the axial direction of the pin, it is possible to press and fix it using an existing press without using the machine exclusively for pressing. In the present invention, the link and the pin can easily and strongly be fixed only by exchanging a press jig provided on a tip end of the existing link press to a pressing-for-fixing jig of the present invention.

The above-described fixing method of the links and the pin of the crawler belt according to the present invention can apply a pressing-for-fixing jig corresponding to an end surface shape of the outer side fixing end surface of the pin or the link, and the pin and the link can be fixed in various manner. For example, if the outer periphery of the pressing-for-fixing jig is tapered and a peripheral surface of the tapered surface is formed uneven, it is possible to locally deform and diametrically enlarge the peripheral edge portion of the recess of the pin end surface, instead of the merely slits in the diameter-enlarging direction along the peripheral edge portion, and further stronger shearing strength in the axial direction can be obtained.

According to a seventh aspect of the present invention, the fixing method further comprises the steps of: forming a fitting groove for a wedge-shaped arc member at the outer fixing end surface of the pin or link; mounting the wedge-shaped arc member in the fitting groove; and pressing the pressing-for-fixing jig in an axial direction of the pin, thereby plastically deforming at least a part of the outer fixing end surface of the pin or link via the wedge-shaped arc member.

Although a part of the outer fixing end surface of the pin or link is plastically deformed directly by the pressing-for-fixing jig mounted to the press in the sixth aspect of the present invention, in this seventh aspect of the present invention, the wedge-shaped arc member is once mounted in the fitting groove formed in the outer fixing end surface of the pin or link temporarily, and then the wedge-shaped arc member is pressed in the axial direction of the pin, thereby plastically deforming a part of the outer fixing end surface of the pin or link. Therefore, since the wedge-shaped arc member is embedded in the pressing surface of the plastically deformed portion by the pressing, even if a great load in the axial direction is applied between the pin and the link after they are fixed, the deformed portion should not revert to its original shape. As a result, when the link is pulled out from the pin to change the press-fit position of the pin with respect to the link for example, the projection which is deformed and projected is reliably removed. Typical cross sectional shapes of the wedge-shaped arc member of the present invention are wedge-shape, circle, semicircle or the like.

According to an eighth aspect of the present invention, an applied force by the pressing of the pin in the axial direction is detected, and when a detected value reaches a target value which is previously set, operation of said press is stopped. With this method, the pressing force of the pressing jig is appropriately transmitted to the pin reliably, and deformation of all of the pins can be controlled uniformly.

BRIEF DESCRIPTION OF THE DRAWINGS

FIGS. 7A to 7D are explanatory views showing a fixing procedure of a pin and a link by deforming a side of a link according to a fifth example of a fixing structure of the present invention.

PREFERRED EMBODIMENTS OF THE INVENTION

Preferred embodiments of the present invention will be explained concretely based on the accompanying drawings.

Figure 1A:
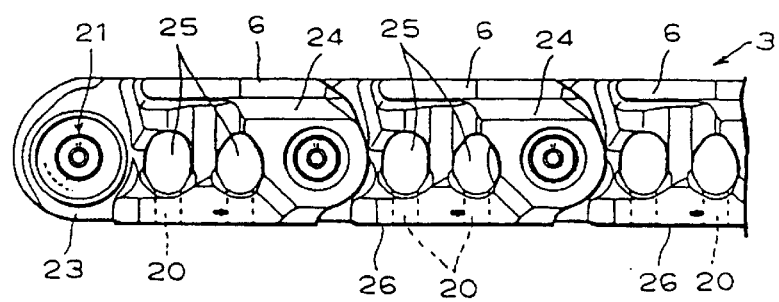
FIGS. 1A to 1C are explanatory views of a structure showing a part of a link chain in a crawler belt of the present invention.
Figure 1B:
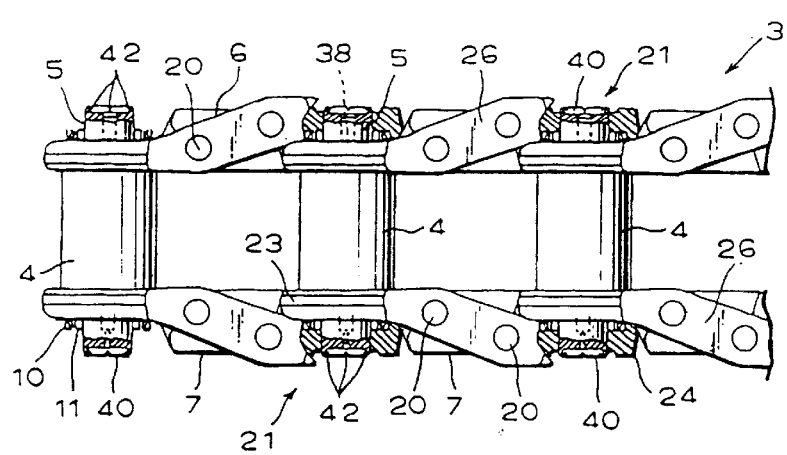
Figure 1C:
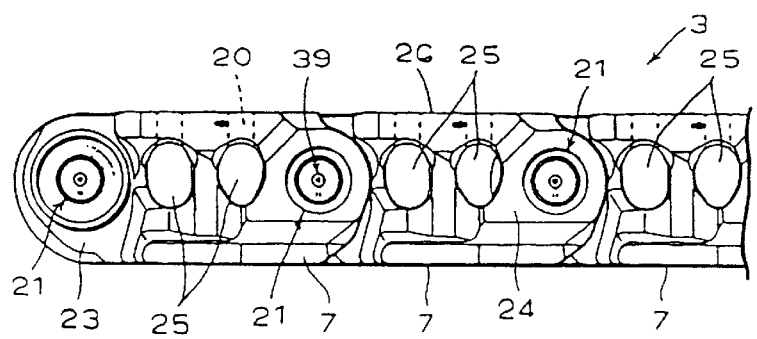
Figure 2:
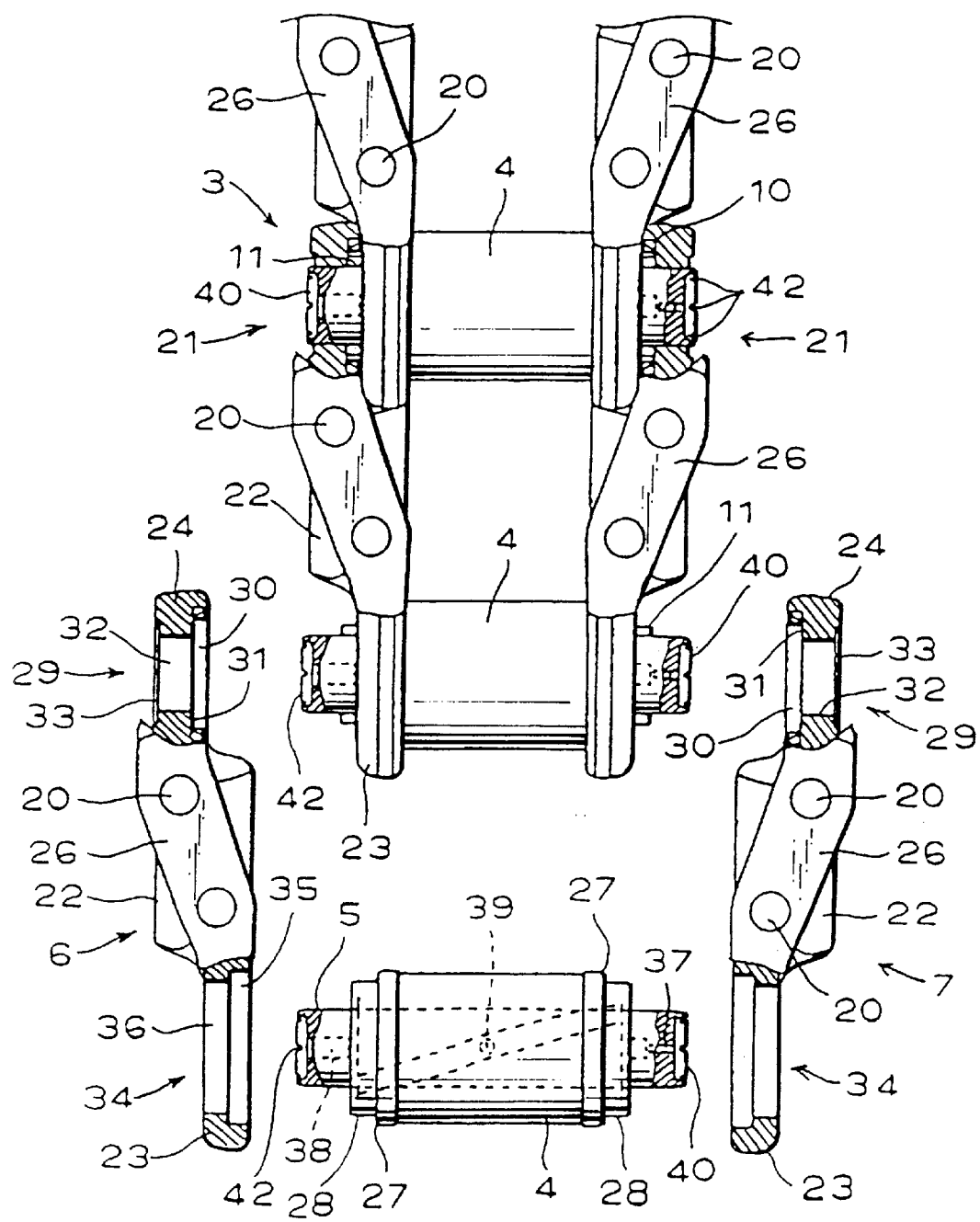
FIG. 2 is an exploded view showing a part of the link chain in an exploded manner.

FIGS. 1A to 1C are explanatory views of a structure showing a part of a link chain in a crawler belt of the present invention, and FIG. 2 is an exploded view showing a part of the link chain in an exploded manner. In these drawings, members and the like which are the same as those in the prior art shown in FIGS. 12 to 14 are designated by the same reference numbers.

In FIGS. 1 and 2, a plurality of left and right pair of endless links 6, and 7 are connected in a link chain 3 in articulation manner. A plurality of ground contacting crawler plates 2 shown in FIG. 14 are fixed to crawler-belt-mounting holes 20 of the links 6 and 7 by bolts. The link chain 3 and the crawler plates 2 constitute a crawler belt 1 as shown in FIG. 14. The crawler belt 1 is rotatably wound around running driving wheels comprising a driving wheel disposed at a rear portion of a crawler vehicle of a construction machine or the like (not shown), an idler wheel disposed at a front portion of the crawler vehicle and lower roller wheels disposed at an intermediate portion of the vehicle.

The link chain 3 includes a link assembly connected to a plurality of joints 21 in articulation manner. The link assembly includes the pair of left and right links 6 and 7 which are in mirror symmetry with each other, pins 5 constituting a characteristic feature of the present invention for connecting the links 6 and 7, and cylindrical bushes 4 each of which is tightly fitted on the pins 5. Each of the links 6 and 7 has ends 23 and 24 which are bent inward and outward alternately at front and rear opposite ends thereof except central portions 22. Each of the central portions 22 has two windows 25 at its front and rear portions. The crawler-belt-mounting holes 20 are formed at front, rear, left and right four locations in flat mounting surfaces 26 formed at outer peripheries of the links 6 and 7, and are in communication with the windows 25. The length of each pin 5 is set substantially the same as an outer width between the left and right links 6 and 7. As shown in FIG. 2, each of the bushes 4 has, at its outer peripheral edges of opposite ends, a bush-engaging portion 28 for press-fitting the link through a step 27.

Each of the ends 24 which are bent outward of the left and right links 6 and 7 is a pin-press-fit end for connecting to the pin 5. The pin-press-fit end 24 has a pin-press-fit hole 29 for press-fitting the opposite ends of the pin 5. Each of the other ends 23 which are bent inward of the links 6 and 7 constitutes a bush-press-fit end for press-fitting and fixing the bush engaging portion 28. The bush-press-fit end 23 has a bush-press-fit hole 34 for press-fitting the bush 4. The size of the pin-press-fit end 24 in its longitudinal direction is set shorter than the size of the bush-press-fit end 23 in the same direction, and tip ends of the pair of ends 23 and 24 are formed into substantially semicircles.

Each pin-press-fit hole 29 into which the pin 5 is press-fitted has a fitting hole 30 to which a sealing member 10 for sealing lubricant stored in the pin 5 and a crush-preventing spacer 11 for the sealing member 10 are fitted concentrically, a pin-fitting hole 32 having a smaller diameter than the fitting hole 30 and formed in the fitting hole 30 via a retaining step 31 for retaining to the sealing member and the spacer, and a pin-end retaining hole 33 having a greater diameter than the pin-fitting hole 32. The bush-press-fit hole 34 formed in each bush-press-fit end 23 of the links 6 and 7 includes a retaining hole 35 for retaining the bush 4, and an engaging hole 36 for engaging the bush engaging portion having a smaller diameter than the retaining hole 35.

One end of the pin 5 has at its axis center an oil filling hole 37 for filling the lubricant, and a lubricant reservoir 38 which is in communication with the oil filling hole 37 is formed on the axis of the pin 5. The lubricant reservoir 38 and an outer peripheral surface of the pin 5 are in communication with each other through a branch hole or an oil hole 39, so that the lubricant is supplied to an inner peripheral surface of the bush. The oil filling hole 37 is occluded by a lubricant-sealing plug (not shown).

FIGS. 3 to 6 show a typical fixing structure of the present invention for plastically deforming a fixing end surface of the pin.

Figure 3A:
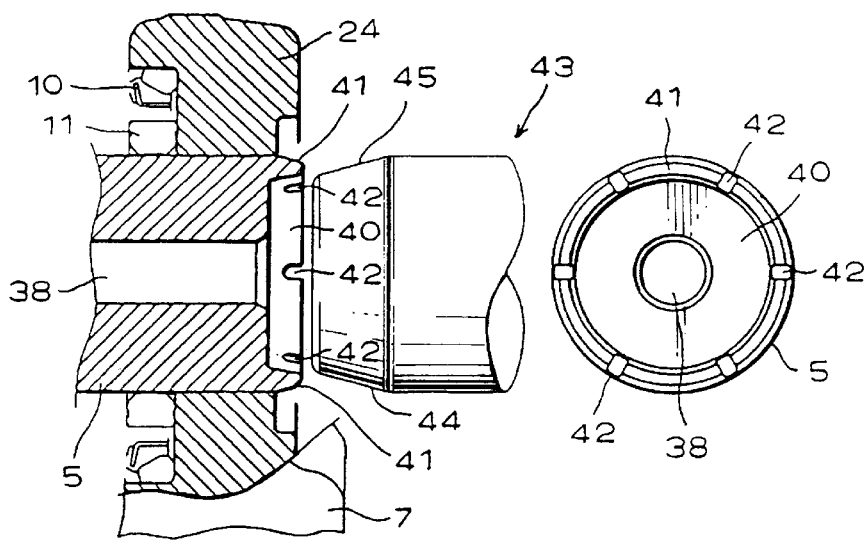
FIGS. 3A and 3B are explanatory views showing a first example of a structure of a pin and a pressing-for-fixing jig for the pin according to the present invention.
Figure 3B:
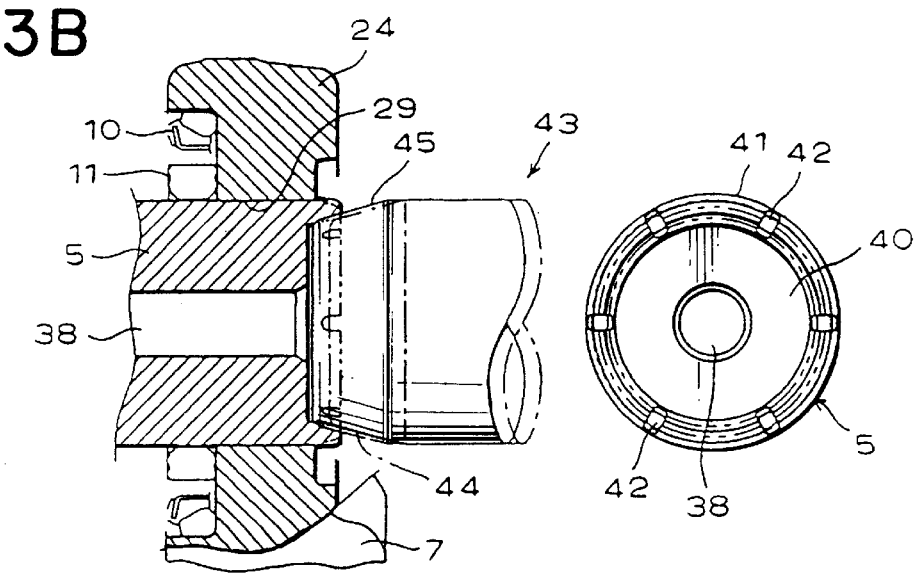

FIGS. 3A and 3B show an example of a first fixing structure of the pin 5 and a pressing-for-fixing jig 43. As shown in FIGS. 3A and 3B, at least one end of the pin 5 has a tapered surface whose tip end is reduced in diameter by about 10°, and the pin end has a recess 40 at a central portion of its end surface. This recess 40 is tapered toward its bottom portion, and is in communication with the lubricant reservoir 38 which is occluded by the lubricant sealing plug (not shown). In the present invention, the recess 40 may have an arbitrary cross sectional shape, such as circular or polygonal cross section. An opening peripheral edge 41 of the recess 40 is formed into such a shape that can be deformed easily when the pin is pressed in the axial direction. For example, the opening peripheral edge 41 may have a plurality of notches extending radially at predetermined distances from one another in the circumferential direction thereof as illustrated.

If the opening peripheral edge 41 of the recess 40 is pressed from inside by a pressing-for-fixing jig having a tapered surface which will be described later, a part of the opening peripheral edge 41 which is adjacent each notch is plastically deformed in a direction for increasing its diameter toward a peripheral surface of the pin-press-fit hole 29 of each of the links 6 and 7, and the opening peripheral edge 41 is fixed along the periphery of the pin-press-fit hole 29 of each of the links 6 and 7. At that time, since the deformed portion exists over the entire peripheral edge of the opening peripheral edge 41 except the notches, a sufficient shearing force in the axial direction can be secured, as compared with the conventional case in which a part of a boss projecting outward from the peripheral edge of the pin-press-fit hole 29 of the links is pressed and deformed locally in its inner diametrical direction to be engaged with the ring-like groove formed in the pin peripheral surface. Therefore, rattle is not generated even if shock is applied from outside.

FIGS. 3 to 6 show modifications in shape of the pin end, shape of a pressing portion of the pressing-for-fixing jig 43 of the present invention which is preferable for processing and deforming the shape of the pin end, and a deformed shape of the pin end by the pressing of the pressing-for-fixing jig 43. In the present embodiment, an excellent fixing method of the links and the pin of the crawler belt can be obtained by appropriately selecting the shape of the pressing-for-fixing jig 43 corresponding to the pin 5.

An example of a fixing structure shown in FIGS. 3A and 3B is a first embodiment in which a pressing-for-fixing jig 43 having a pressing portion 44 whose tip end peripheral surface has a tapered surface 45 in correspondence to an end of an uneven pin 5 having a plurality of slits 42 that are notched in an opening peripheral edge 41 of a recess 40 in the pin end and are displaced in phase by 60°. The tapered surface 45 of the pressing portion 44 has an inclining angle which is gradually enlarged in diameter toward its base end. The diameter of the base end of the tapered surface 45 is greater than a size of an opening of the recess 40 formed in the pin end surface.

Therefore, when the pressing-for-fixing jig 43 is pushed into the recess 40 in the axial direction thereof as operated by an existing link press or the like (not shown), the pressing portion 44 which is the tapered surface of the pressing-for-fixing jig 43 presses an inner wall surface of the opening peripheral edge portion 41 of the recess 40 as shown in FIG. 3B, so that a projection between the slits 42 of the pin 5 is plastically deformed while being widened in the radial direction. Then, the opening peripheral edge portion 41 of the pin 5 is fixed along the opening peripheral portion of the pin-press-fit hole 29. At that time, it is possible to easily process the opening peripheral edge portion 41 of the pin 5 with a small pressing force, as compared with the pin 5 having a recess which does not have any slits.

Figure 4A:
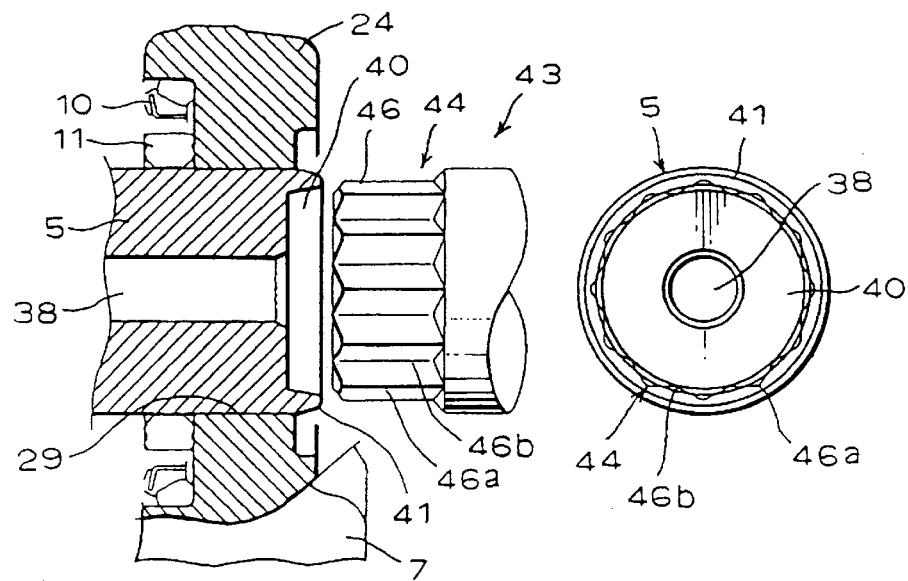
FIGS. 4A and 4B are explanatory views showing a second example of a structure of a pin and a pressing-for-fixing jig for the pin according to the present invention.
Figure 4B:
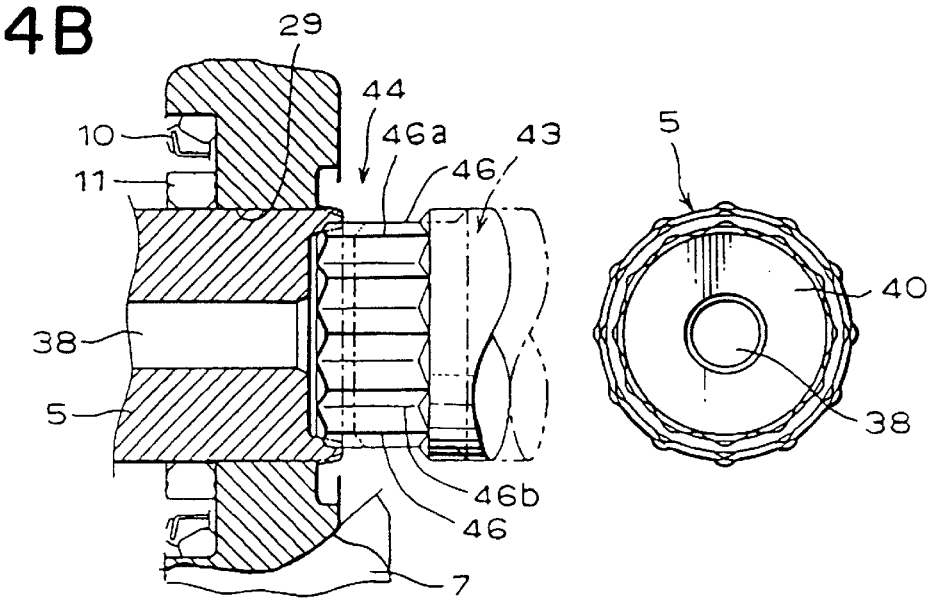

An example shown in FIGS. 4A and 4B is a second embodiment in which a pressing-for-fixing jig 43 formed into a corrugated shape in a circumferential direction thereof has, at a tip end peripheral surface thereof, a corrugate pressing portion 44, in correspondence to a recess 40 having a ring-like opening peripheral edge portion 41 formed in the pin end surface. An outer diameter of a convex portion 46a of the pressing portion 44 whose peripheral surface is corrugated is formed to be greater than an inner diameter of an opening of the recess 40 of the pin 5, and an outer diameter of a concaved portion 46b of the pressing portion 44 is set at substantially the same as an inner diameter of a bottom of the recess 40. Therefore, when the pressing-for-fixing jig 43 is pushed into a central portion of the pin recess 40 by operation of an existing link press or the like (not shown), the convex portion 46a of the pressing portion 44 of the pressing-for-fixing jig 43 presses and deforms the inner peripheral surface of the opening peripheral edge portion 41 of the pin recess 40 as shown in FIG. 4B, so that the opening peripheral edge portion 41 is widened in a radial direction thereof into substantially a corrugated shape, and is fixed along the opening periphery of the pin-press-fit hole 29 of the link 7. As compared with the first embodiment, since the pressing force is dispersed so that the opening peripheral edge portion 41 of the recess 40 is locally deformed over the plurality of portions thereof, it can be deformed effectively with a small pressing force.

Figure 5A:
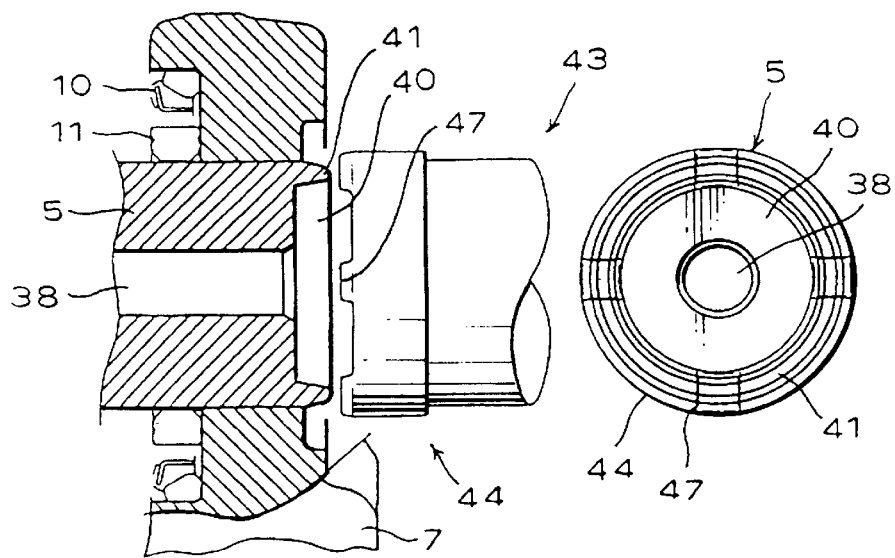
FIGS. 5A and 5B are explanatory views showing a third example of a structure of a pin and a pressing-for-fixing jig for the pin according to the present invention.
Figure 5B:
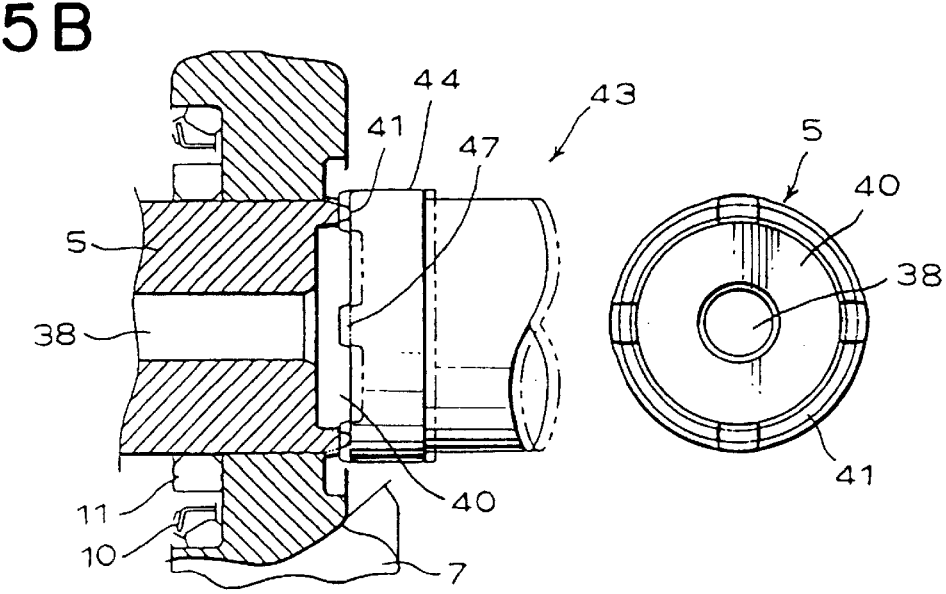

According to an example of a third fixing structure shown in FIGS. 5A and 5B, a pressing-for-fixing jig 43 with a pressing portion 44 has four projections 47 projecting from a tip end of the pressing-for-fixing jig 43 so as to be displaced from one another by through 90°, in correspondence to a recess 40 having a ring-like opening peripheral edge portion 41 formed in the pin end surface as in the example of the second fixing structure shown in FIGS. 4A and 4B. An outer diameter of the pressing portion 44 is formed to be greater than an outer diameter of the pin 5, and a size of each projection 47 in its diametrical direction in the pressing portion 44 is formed to be greater than a size of the opening peripheral edge portion 41 of the recess 40 of the pin end in its diametrical direction.

When the pressing-for-fixing jig 43 is pushed toward a center of the pin recess 40 by operation of an existing link press or the like, the plurality of projections 47 of the pressing-for-fixing jig 43 press the opening peripheral edge portion 41 of the recess 40 of the pin 5 as shown in FIG. 5B, and crush the opening peripheral edge portion 41 of the pin 5 intermittently, and widen the pin 5 in a radial direction thereof to fix the pin end along an opening periphery of the pin-press-fit hole 29 of the link 7. As compared with the above-described example of the second fixing structure, since a pressing force of the press is directly applied to the pin end surface, it is possible to plastically deform the opening peripheral edge portion 41 of the pin 5 with a pressing force smaller than that in the axial direction of the pin 5.

Figure 6A:
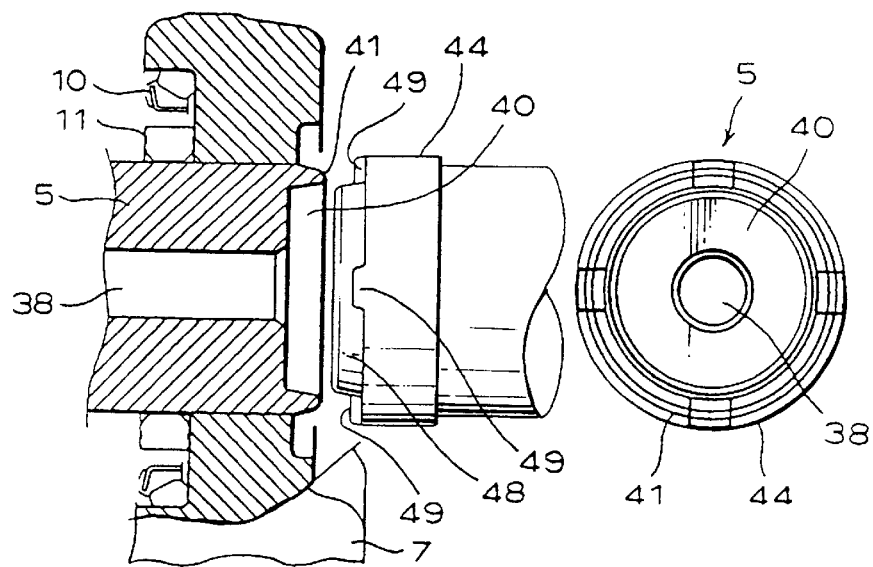
FIGS. 6A and 6B are explanatory views showing a fourth example of a structure of a pin and a pressing-for-fixing jig for the pin according to the present invention.
Figure 6B:
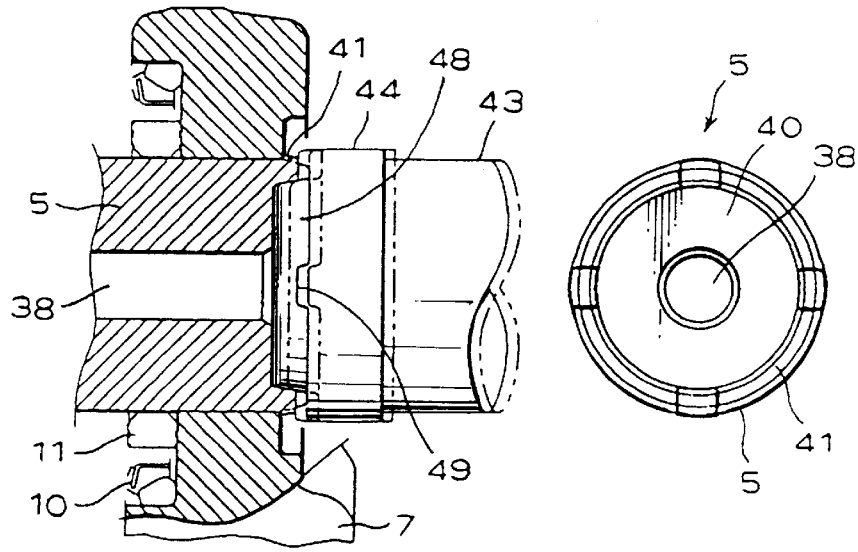

According to an example of a fourth fixing structure shown in FIGS. 6A and 6B, a pin end has a recess 40 of the same shape as those of the examples of the second and third fixing structures, while a pressing-for-fixing jig 43 has a tapered first pressing portion 48 whose tip end projects along a center of thereof, and a second pressing portion 49 projecting from a base end outer peripheral portion of the first pressing portion 48 such that it is displaced in phase by 90° from one another. A tapered surface of the first pressing portion 48 includes an inclining surface which is substantially the same as an inclining angle of the inner peripheral surface of the recess 40. An outer diameter of the second pressing portion 49 is set greater than an outer diameter of the pin 5, so that the second pressing portion 49 crushes the opening peripheral edge portion 41 of the recess 40 in the axial direction of the pin to widen the opening peripheral edge portion 41 in the radial direction to deform the same while restraining its inward deformation by the tapered surface of the first pressing portion 48.

Therefore, when the pressing-for-fixing jig 43 is pushed toward a bottom surface of the pin recess 40 by operation of an existing link press or the like (not shown), the first pressing portion 48 of the pressing-for-fixing jig 43 is pushed in the recess 40 toward the bottom surface while sliding along the inner peripheral surface of the recess 40 of the pin 5 and at the same time, the second pressing portion 49 crushes the opening peripheral edge portion 41 in the pin-axial direction to widen the pin 5, so that the pin end is fixed along the opening periphery of the pin-press-fit hole 29 of the link 7. Since the pin 5 is crushed by the second pressing portion 49 in the axial direction while restraining the inward deformation of the opening peripheral edge portion 41 by the tapered surface of the first pressing portion 48, it is possible to reliably deform the opening peripheral edge portion 41 outward, and the retaining force in the axial direction of the pin is reliably and sufficiently provided.

In assembling of the pin 5, and its links 6, 7 by employing the fixing structures according to the present embodiment of the present invention, the pin 5 is previously inserted into the bush 4 such that the opposite ends of the pin 5 are exposed outside. Thus, they are assembled as a pin/bush assembly. The pin/bush assembly, the pin-press-fit hole 29 and the bush-press-fit hole 34 of the links 6 and 7 are coaxially disposed, and the pin/bush assembly is set between a left press-fit jig and a right press-fit jig of an existing link press (not shown). Next, the left and right press-fit jigs are operated, and bush-press-fit holes of a first set of left and right master links (half cut link having only bush side) are fitted to the bush 4 of the pin/bush assembly. At that time, the pin 5 of the pin/bush assembly is exposed outside from the bush-press-fit holes 34 of the left and right master links. The first set of the left and right master links are sent out in this manner, and a next pin/bush assembly is set by the same operation.

Next, in a state in which the crawler-belt-mounting surface 26 formed at the links 6 and 7 is disposed at an upper side thereof, a right link 7 in a next position in which the lubricant-sealing member 10 is previously fitted to the fitting hole 30 of the pin-press-fit hole 29 is set to the right press-fit jig of the link press. Next, a crush-preventing spacer 11 for the sealing member is fitted over the end of the pin 5 projecting from the right master link of the first set and then, the left press-fit jig of the link press is operated so that the left press-fit jig is pushed against the right press-fit jig, thereby press-fitting the end of the pin 5 exposed outside from the bush-press-fit hole 34 of the right master link into the pin-press-fit hole 29 of the right link 7 in the next position. Simultaneously, the bush 4 of the pin/bush assembly in the next position is press-fitted into the bush-press-fit hole 34 of the right link 7 in the same next position. At that time, the pin end of the pin/bush assembly in the next position is exposed outside from the bush-press-fit hole 34 of the right link 7 in the next position.

Next, the left link 6 in the next position to which the sealing member 10 is mounted is set to the left press-fit jig in the same manner as the above-described press-fit operation of the right link 7 in the next position, a crush-preventing spacer 11 for the sealing member 10 is mounted to the pin 5 of the left master link of the first set in the same manner and then, the right press-fit jig is operated, the right press-fit jig is pushed against the left press-fit jig so that the end of the pin 5 exposed outside from the bush-press-fit hole 34 of the left master link is press-fitted into the pin-press-fit hole 29 of the left link 6 in the next position, and simultaneously, the bush of the pin/bush assembly in the next position is press-fitted into the bush-press-fit hole 34 of the left link 6 in the next position. At that time, the pin end of the pin/bush assembly in the next position is exposed outside from the bush-press-fit hole 34 of the left link 6 in the next position. With the above operation, the assembling operation of the second set of the left and right links 6 and 7 is completed.

After a predetermined number of left and right links 6 and 7 are assembled by repeating the above-described assembling operation, the pin-press-fit holes of the left and right master links (half cut link having only pin side) as the final links which are not shown are fitted on the ends of the pin exposed outside from the bush-press-fit holes 34 of the left and right links 6 and 7 in the preceding position. With this operation, the final links are assembled to the left and right master links, thus press-fit operation of all of the pins and the links is completed, and a link chain is formed.

The fixing method of the links and the pin of the crawler-belt according to the present invention is carried out in the following manner. Although there will be explained a case in which a plurality of pin/bush assemblies are press-fitted to the links 6 and 7 to assemble the link chain and then, the pin 5 and the links 6 and 7 are fixed in accordance with the present invention, the fixing method of the pin 5 and the links 6 and 7 of the present invention can also be carried out after each of the pin/bush assemblies is press-fitted to two sets of left and right links 6 and 7 in the preceding and next positions and assembled.

After the press-fit operation is completed, the fixing operation of the links and the pin of the crawler belt of the present invention is carried out. First, the right press-fit jig provided on a tip end of the link press is removed, and a pressing-for-fixing jig 43 of the present invention is mounted. Next, the pin 5 of the right link 7 is positioned and fixed coaxially with the pressing-for-fixing jig 43 between the left press-fit jig of the link press and the right pressing-for-fixing jig 43. Defining the left press-fit jig as a receiving side, the pressing-for-fixing jig 43 is operated by the link press, the pressing-for-fixing jig 43 is pushed into the recess 40 formed in the right end surface of the pin 5 to push the pin 5 in the axial direction thereof, and the opening peripheral edge portion 41 of the recess 40 is enlarged in diameter along the opening periphery of the pin-press-fit hole 29 of the right link 7.

Then, after the fixing operation is completed, the pin 5 of the right link 7 in the preceding position is sent out, and the fixing operation of the pin 5 of the right link 7 in the next position is carried out in the same manner. At that time, for example, the actually detected pressing force of the pin 5 in the axial direction thereof is compared with control data, e.g., target value data which is previously set. When the detected value is within a threshold value, a control apparatus (not shown) controls it such that the link press automatically stops.

As explained based on FIGS. 3 to 6, in the present invention, at least one end surface of the pin 5 is widened in its diameter along the opening periphery of the pin-press-fit hole 29, and the right link 7 is fixed to the end of the pin 5. This fixing operation is successively repeated, and the fixing operation of the right links 7 and the pins 5 is completed. As a result, the link chain 3 is completed in this manner.

After the link chain 3 is completed, lubricant is filled from the oil filling hole 37 of each of the pins 5 into the lubricant reservoir 38, and the oil filling hole 37 is closed by the lubricant sealing plug to seal the lubricant. Next, the crawler plate 2 is mounted to the link chain 3 via the crawler-belt-mounting holes 20 of the links 6 and 7 by mounting bolts or the like using a crawler-belt-mounting impact wrench or the like (not shown), thereby completing the crawler belt 1.

As apparent from the above description, according to the fixing method of the crawler belt, the links and pins of the crawler belt of the present embodiment, since it is possible to enlarge not only the diameter of the pin end over the outer peripheral surface of each pin, but also the width, thickness and the like of the diametrically enlarged portion of the outer peripheral surface of the pin, it is possible to precisely and sufficiently provide a retaining force in the axial direction of the pin. Further, since the pin is fixed to the links over the entire peripheral edge of the pin, the retaining force of the pin in its axial direction becomes stronger, and even if impact is applied from outside, the pin can be prevented from being moved in the axial direction completely.

Therefore, even if each of the links receives external force in the axial direction applied from the flange of the lower roller, the roller guard or the like, it is possible to prevent the lubricant-sealing member and the crush-preventing spacer from being deformed and damaged, and to sufficiently secure the durability as a link chain.

When the pin and the links are assembled, since it is possible not only to prevent the pin from being damaged at the time of plastically processing of the pin end, but also to pressurize and deform the end surface of the pin in the axial direction of the pin which is the same direction as the press-fit direction of the link with respect to the pin, it is possible to fix the links and the pin of the crawler belt only by replacing a pressing jig provided on the tip end of an existing press with the pressing-for-fixing jig of the present invention.

Further, according to the fixing method of the links and the pin of the crawler belt according to the above-described embodiments, the links and the pin are fixed more appropriately by controlling the pressing force of the pressing-for-fixing jig by the control apparatus in accordance with the shapes or the like of the pin and the tip end of the pressing-for-fixing jig.

FIGS. 7 to 11 show an example of a typical fixing structure and an example of its fixing method in which plastic deformation by pressure is carried out on the links. In the following explanation, members having substantially the same structure as those of the above embodiments are designated by the same reference numbers.

Figure 8:
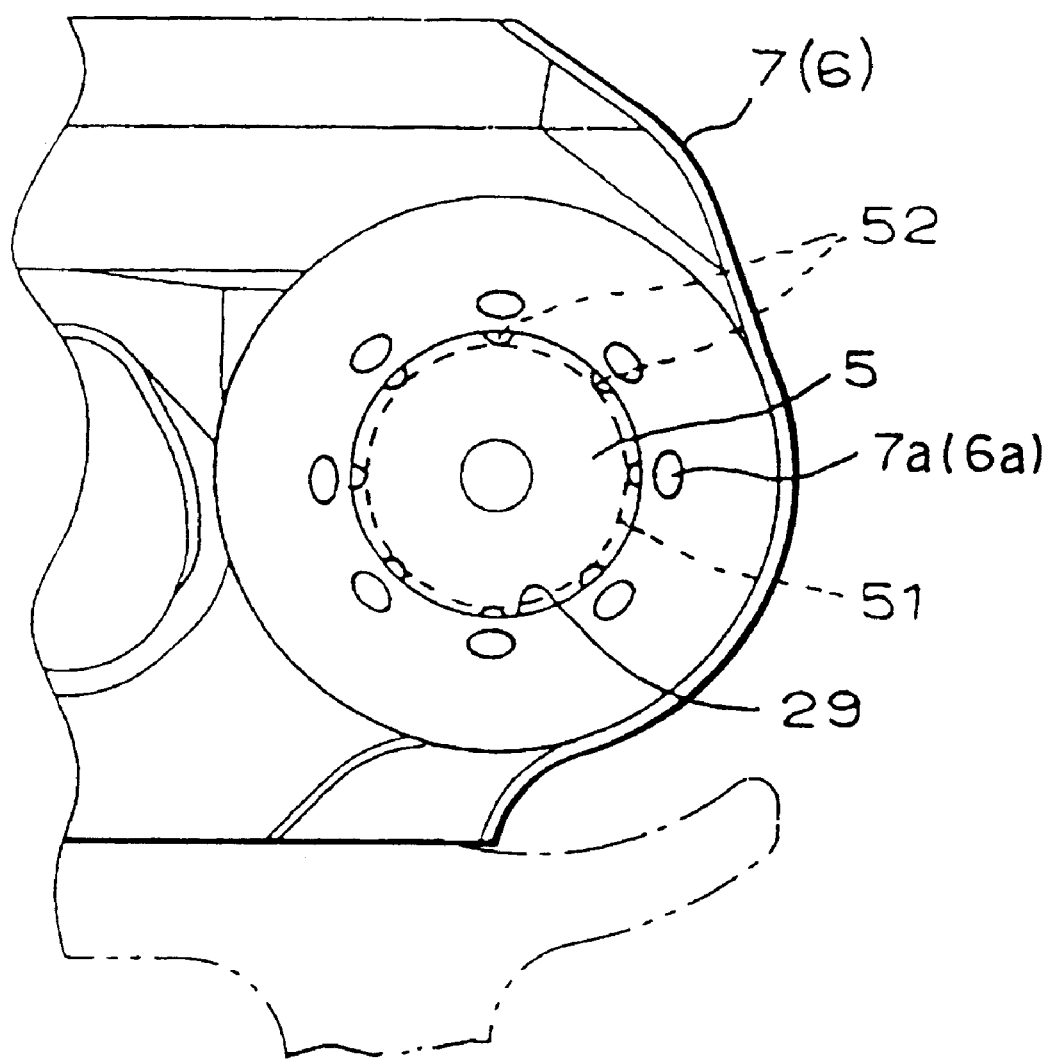
FIG. 8 is a front view showing a fixed end surface of the pin and the link fixed in accordance with the fixing procedure of the fifth example.

According to an example of a fifth fixing structure of the pin 5 and the right link 7 and an example of fixing method thereof as shown in FIGS. 7 and 8, a ring-like retaining groove 51 is formed in a peripheral surface of the press-fit end of the pin 5, the pin end is press-fitted into the pin-press-fit hole 29 of the right link 7 and then, the pressing-for-fixing jig 43 locally presses a circumferential end surface of an opening peripheral edge of the pin-press-fit hole 29 with predetermined distances in the axial direction of the pin 5. The pressing-for-fixing jig 43 in this case has a diameter greater than an outer diameter of the pin 5, and has, at its one end surface along its outer periphery, a plurality of projections, each of which has an oval cross section, disposed with a predetermined difference in phase (30° in the illustrated embodiment). This pressing-for-fixing jig 43 is mounted to a non-illustrated assembling press for the crawler belt, and the above-described pressing operation is carried out using the press.

When the opening peripheral edge portion of the pin-press-fit hole 29 of the right rink 7 is pressed by the pressing-for-fixing jig 43 to locally deform the opening peripheral edge portion and form a pressing portion 7a, a part of the inner peripheral surface of the pin-press-fit hole 29 of the link 7 relative to the retaining groove 51 of the pin 5 is projected locally, and is fitted and retained therein. The size, the shape and the number of the projections 52 can be arbitrarily be changed in accordance with necessary shearing force.

Figures 9A, 9B, 9C:
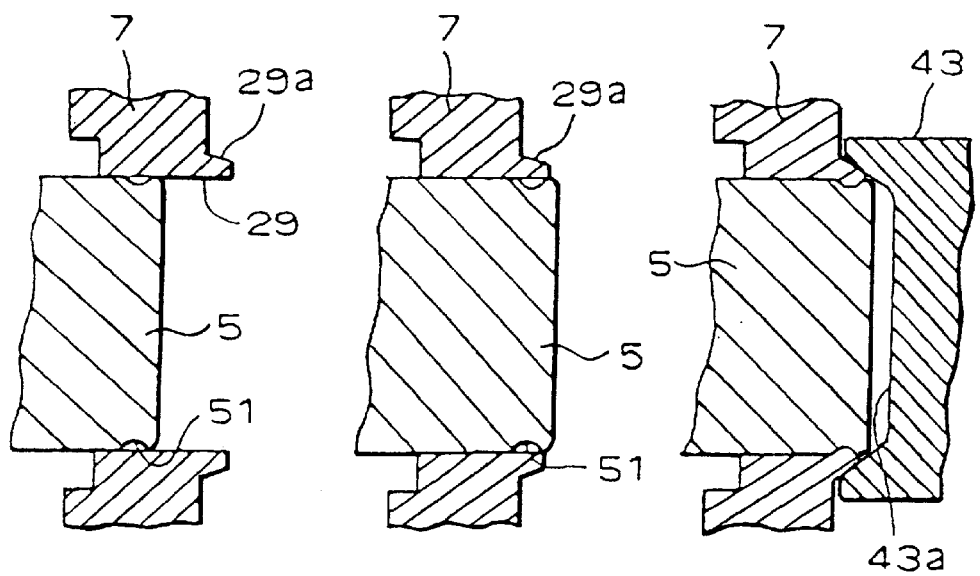
FIGS. 9A to 9C are vertical sectional views showing fixed end surfaces of the pin and the link by deforming a side of a link according to a sixth fixing structure of the present invention.
Figure 10:
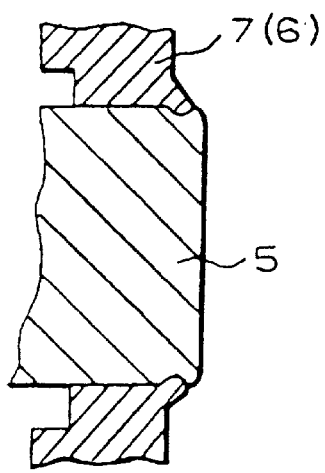
FIG. 10 is a an explanatory view showing a fixing procedure of the pin and the link according to the sixth example.

FIGS. 9 and 10 show an example of a sixth fixing structure of the present invention and a fixing procedure thereof. A press-fit end of a pin 5 has at its peripheral surface a ring-like continuous retaining groove 51, and a plurality of projecting pieces 29a are horizontally projecting intermittently from an opening end periphery of a pin-press-fit hole 29 of a right link 7. The press-fit end of the pin 5 is press-fitted into the pin-press-fit hole 29 of the right link 7. When the projecting piece 29a is located above the retaining groove 51 (FIG. 9B), the pin 5 is pressed along its center line by the pressing-for-fixing jig 43. The pressing-for-fixing jig 43 in this case has a diameter greater than an outer diameter of the projecting piece 29a of the right link 7, and has a pressing end with a recess 43a having an inner peripheral surface tapered inwardly.

If a link end surface at the side of an outer diameter of the projecting piece 29a is pressed continuously or intermittently on the same circumference by the pressing-for-fixing jig 43, the projecting piece 29a is pressed by the inner peripheral surface of the pressing-for-fixing jig 43 and bent and deformed inwardly. As a result, the projecting piece 29a is fitted into the retaining groove 51 formed in the end of the pin 5 and retained and fixed as shown in FIG. 10.

Figure 11A:
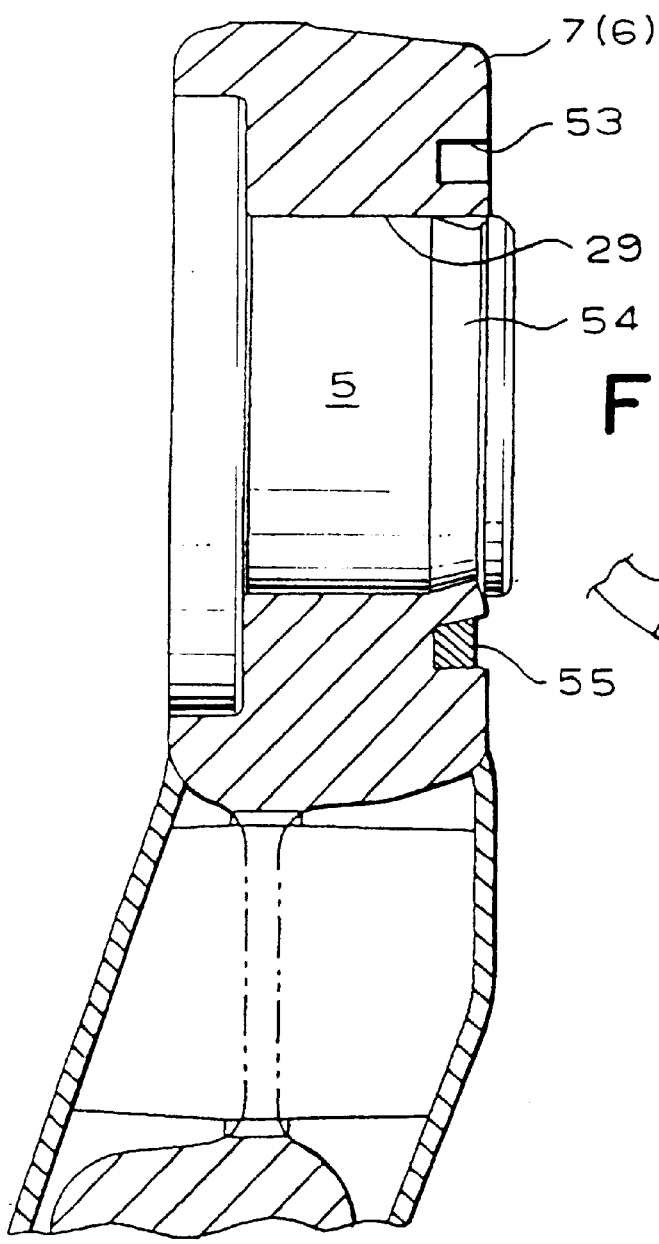
FIGS. 11A and 11B is an explanatory view showing a seventh example of a fixing structure by deforming a side of a link and an example of a structure of the link and a pressing-for-fixing jig according to the present invention.
Figure 11B:
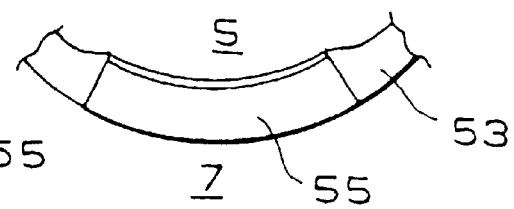

FIGS. 11A and 11B shows an example of a seventh fixing structure of the present invention. A circumferential groove 53 for press-fitting wedge-shaped members, whose side wall surfaces are substantially in parallel, is previously formed in an opening peripheral edge portion of a pin-press-fit hole 20 of an end surface of a link 7. A ring-like groove 54 having a right triangle cross section is formed in an outer peripheral surface of the press-fit end of the pin 5. After the pin 5 is press-fitted into the pin-press-fit hole 29 of the link 7 having the above-described shape, a plurality of arc wedge-shaped members 55 are fitted into the press-fit circumferential groove 53 of the link 7, with a predetermined phase difference.

Next, a non-illustrated press is operated, and the arc wedge-shaped member 55 is pressed along an axis of the pin 5 by a pressing-for-fixing jig 43 mounted to the press. As a result, an inner peripheral portion of the press-fit circumferential groove 53 into which the arc wedge-shaped member 55 is fitted is deformed toward a center of the pin 5 and projected, and is fitted and retained in the ring-like groove 54 formed in the end of the pin 5. The cross section of the arc wedge-shaped member 55 at that time assumes a substantially ladder shape.

Figures 12A, 12B:
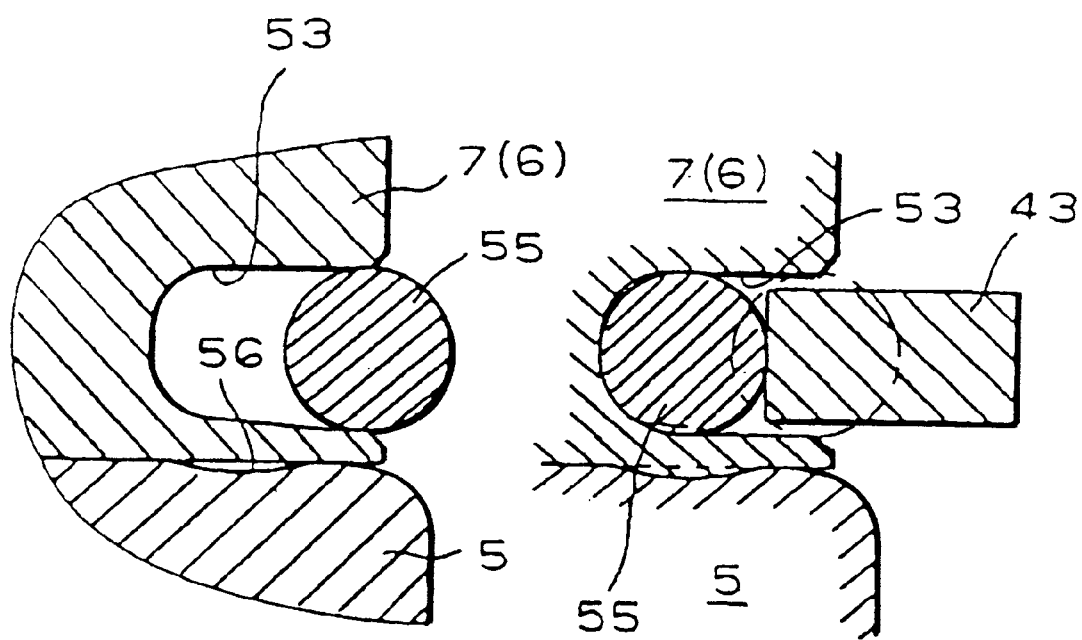
FIGS. 12A and 12B are explanatory views showing an eighth example of a fixing structure by deforming a side of a link and another example of a structure of the link and a pressing-for-fixing jig according to the present invention.

FIGS. 12A and 12B show an example of an eighth fixing structure of the present invention. In this example of the fixing structure, an arc wedge-shaped member 55 has a circular cross section. The structure of a link 7 is substantially the same as that of the example of the sixth fixing structure. However, in the present example of the fixing structure, an end of a pin 5 has a ring-like continuous recess 56, After the arc wedge-shaped member 55 of a circular cross section is previously fitted to a press-fit circumferential groove 53 of the link 7 for press-fitting the wedge-shaped member 55, the arc wedge-shaped member 55 is press-fitted into the press-fit circumferential groove 53 by a pressing-for-fixing jig 43 mounted to a non-illustrated press. By this press-fit, a part of the inner peripheral surface of the press-fit circumferential groove 53 is expanded and retained in the recess 56 of the pin 5.

Figure 13A:
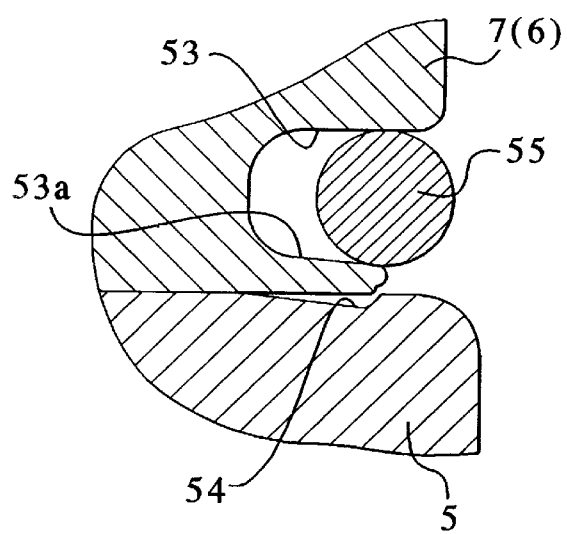
FIGS. 13A and 13B are explanatory views showing a ninth example of a fixing structure by deforming a side of a link and another example of a structure of the link and a pressing-for-fixing jig according to the present invention.
Figure 13B:
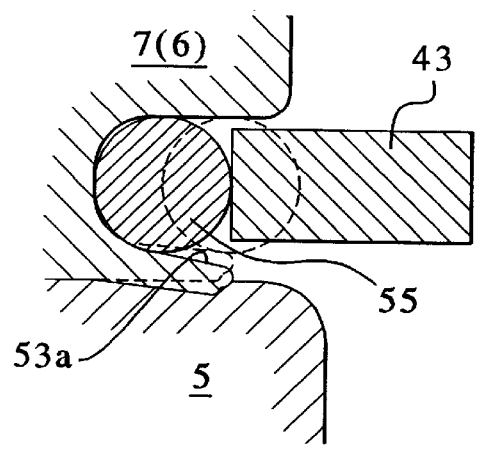
Figure 14:
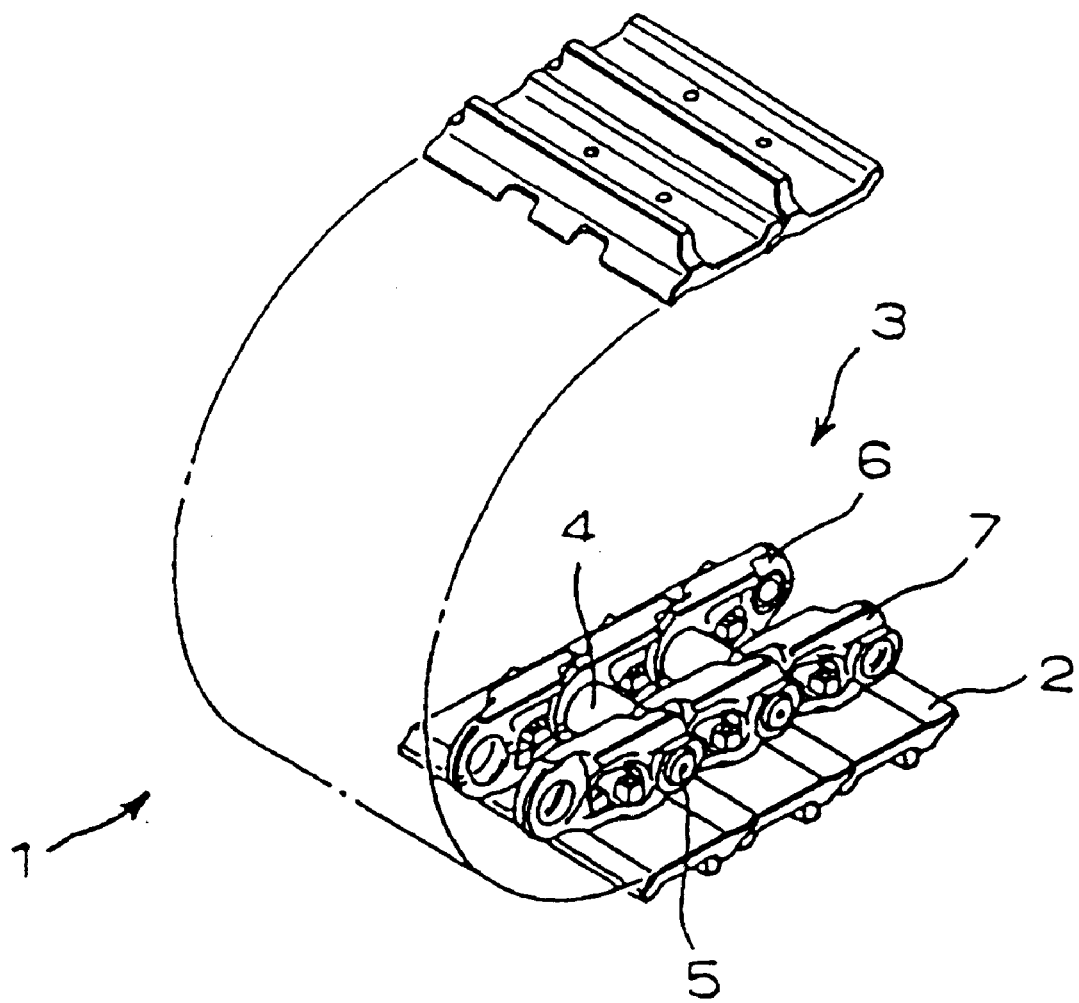
FIG. 14 is a perspective view of a conventional crawler belt, partially cut away.
Figure 15:
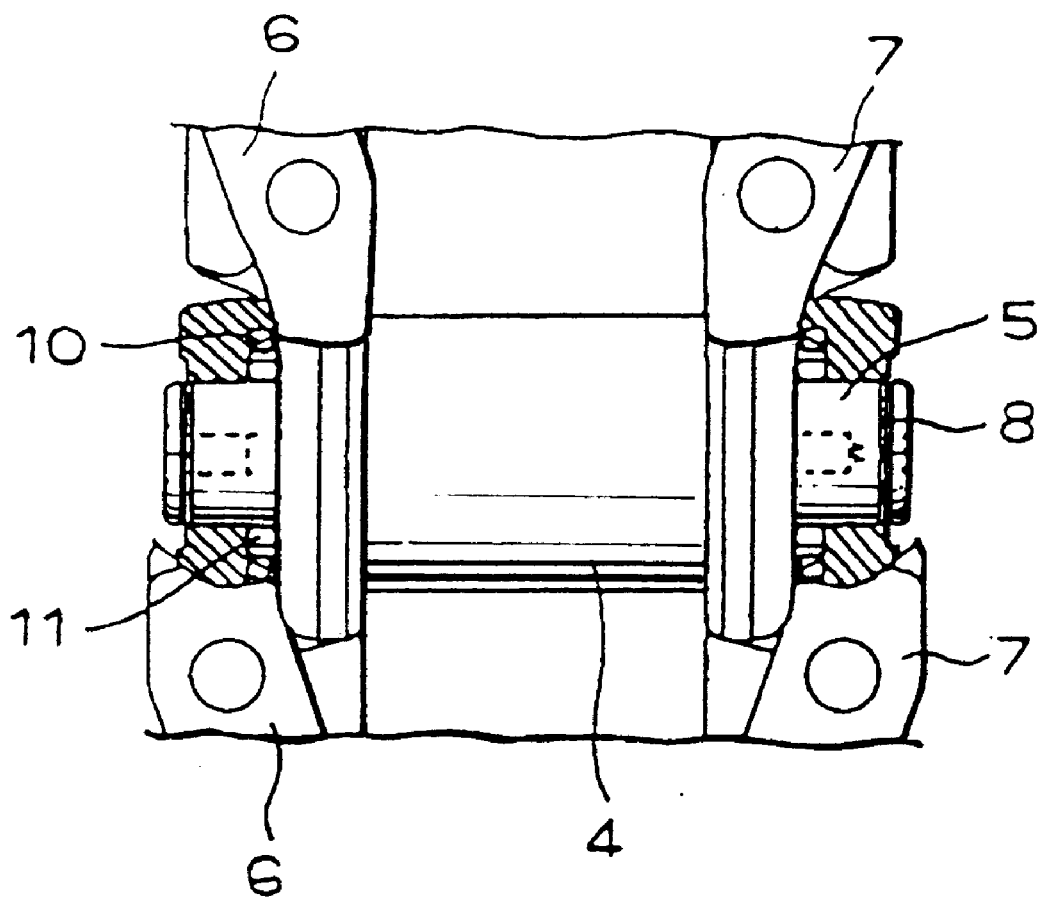
FIG. 15 is an explanatory view showing a structure of a conventional pin-pulling-out-preventing structure.
Figure 16:
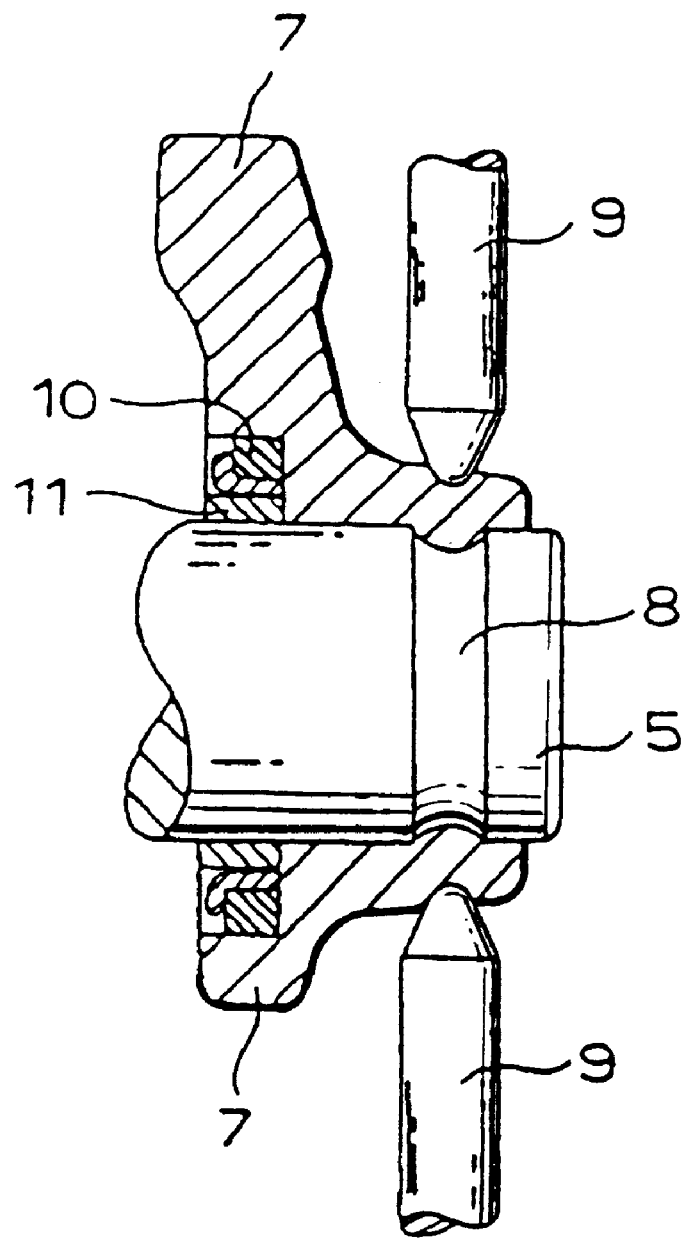
FIG. 16 is an explanatory view showing a structure of another conventional pin-pulling-out-preventing structure.

FIGS. 13A and 13B show an example of a ninth fixing structure of the present invention. According to this example of the fixing structure, an arc member having a circular cross section is used as the arc wedge-shaped member 55 likewise the example of the seventh fixing structure. A press-fit circumferential groove 53 of the link 7 for press-fitting the wedge-shaped member is formed short such that a free end of an inner peripheral surface 53a is disposed slightly inside of an end surface of the link 7. An end of the pin 5 has a ring-like groove 54, into which part of an inner peripheral surface 53c of the press-fit circumferential groove 53 is deformed in an inner diametrical direction thereof and fitted by the press-fit of the arc wedge-shaped member 55, likewise the example of the sixth fixing structure.

The embodiments of the present invention as shown in FIGS. 7 to 13 also exhibit the same operation/working-effect particular to the present invention as that of the embodiments shown in FIGS. 1 to 6. When the press-fit margin of the pin-press-fit hole formed in the link is reduced as compared with the prior art, and the pin is press-fitted with a press-fit force smaller than that of the prior art, the links and the pin can be fixed strongly, the retaining force of the links in the axial direction of the pin can be secured sufficiently. Further, by utilizing an existing press, it is possible to easily and reliably process the pin-pulling-out-preventing structure by the pressing-for-fixing jig mounted to the press without using any exclusive machine. Also when the links are detached from the pin, it is possible to pull out the pin with shearing force exceeding said holding force without making any sliding scratches on the pin peripheral surface and an inner surface of the pin hole of the link, therefore, it is possible to easily change the fixed phase of the pin relative to the links.

As can be understood from the above description, the present invention should not be limited to the above embodiments, and it is possible to variously change the design without departing from the scope of the present invention.

What is claimed is:

1. A fixing structure of links and pins for a travelling crawler belt in which a plurality of pins and bushes are sequentially press-fitted into corresponding pin-press-fit holes and bush-press-fit holes of the links and connected in an endless manner, wherein
    at least a part of an outer fixing end surface of each of said pins or each of said links includes a plastically deformed portion by pressure in an axial direction of said pin.

2. A crawler belt according to claim 1, wherein said plastically deformed portion extends by a length at a peripheral edge portion of said pin-press-fit hole of said link or at said pin in a circumferential direction thereof.

3. A crawler belt according to claim 1, wherein a plurality of said plastically deformed portions are formed, with a predetermined phase difference, at a peripheral edge portion of said pin-press-fit hole of said link or at an end surface of said pin in a circumferential direction thereof.

4. A crawler belt according to claim 1, wherein said plastically deformed portion is formed by a wedge-shaped arc member.

5. A fixing method of links and pins for a running crawler belt in which a plurality of pins and bushes are sequentially press-fitted into corresponding pin-press-fit holes and bush-press-fit holes of the links and connected in an endless manner, said method comprising the steps of:
    press-fitting each of said pins into a corresponding one of said pin-press-fit holes of said links;
    disposing a pressing-for-fixing jig so as to be opposed to an outer fixing end surface of said pin or link;
    pressing said outer fixing end surface of said pin or link by said pressing-for-fixing jig; and
    plastically deforming at least a part of said outer fixing end surface of said pin or link by pressing of said pressing-for-fixing jig.

6. A fixing method of links and pins for a crawler belt according to claim 5, further comprising the steps of:
    press-fitting said pin into said pin-press-fit hole of said link by a press;
    mounting said pressing-for-fixing jig to said press; and
    operating said press, and pressing said outer fixing end surface of said pin or link by said pressing-for-fixing jig.

7. A fixing method of links and pins for a crawler belt according to claim 5, further comprising the steps of:
    forming a fitting groove for a wedge-shaped arc member at said outer fixing end surface of said pin or link;
    mounting said wedge-shaped arc member in said fitting groove; and
    pressing said pressing-for-fixing jig in an axial direction of said pin, thereby plastically deforming at least a part of said outer fixing end surface of said pin or link by said wedge-shaped arc member.

8. A fixing method of links and pins for a crawler belt according to claim 6, wherein a pressing force of said pressing-for-fixing jig is detected, and when a detected value reaches a target value which is previously set, operation of said press is stopped.

9. A fixing structure of links and pins for a travelling crawler belt in which a plurality of pins and bushes are sequentially press-fitted into corresponding pin-press-fit holes and bush-press-fit holes of the links and connected in an endless manner, wherein
    at least a part of an outer fixing end surface of each of said pins or each of said links includes a plastically deformed portion by pressure in an axial direction of said pin,
    wherein a plurality of said plastically deformed portions are formed, with a predetermined phase difference, at a peripheral edge portion of said pin-press-fit hole of said link or at an end surface of said pin in a circumferential direction thereof.

10. A fixture structure of links and pins for a travelling crawler belt in which a plurality of pins and bushes are sequentially press-fitted into corresponding pin-press-fit holes and bush-press-fit holes of the links and connected in an endless manner, wherein
    at least a part of an outer fixing end surface of each of said pins or each of said links includes a plastically deformed portion by pressure in an axial direction of said pin, and a portion confronting with said plastically deformed portion is formed with a retaining portion, into which said plastically deformed portion is fitted and retained by the plastic deformation.

* * * * *